Patented Jan. 15, 1929.

1,698,932

UNITED STATES PATENT OFFICE.

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN.

PURIFICATION OF PHENYL ETHYL ALCOHOL.

No Drawing. Application filed February 12, 1924. Serial No. 692,439.

There are a number of well known methods whereby phenyl ethyl alcohol may be synthetically prepared and the products in all cases are contaminated with impurities which must be eliminated in order to obtain phenyl ethyl alcohol of good color and odor. The impurities encountered in such products include residual portions of the starting materials of the synthesis and may be listed under the general headings of alcohols, esters or aldehydes, and where the method of the synthesis involves the use of the Grignard reaction, diphenyl will also be present constituting the major impurity. The usual calcium chloride method for effecting the purification, besides being a cumbersome and laborious process, does not at once give a pure phenyl ethyl alcohol. My present method rests on the discovery that phthalic anhydride, as well as certain other anhydrides of similar constitution, such as maleic anhydride and succinic anhydride, will readily react with phenyl ethyl alcohol either alone or in benzene, toluene, ether, or equivalent solvent medium, to form monophenyl ethyl ester of the acid corresponding to such anhydride. I have now further discovered that phenyl ethyl alcohol may be freed from all non-alcoholic impurities by steam distillation of mono-phenyl ethyl phthalate or equivalent ester obtained as just stated; and the present invention accordingly consists of the foregoing and related steps as hereinbefore fully described and particularly pointed out in the claims, the following description setting forth several of the various ways in which the principle of the invention may be used.

Preliminarily to converting the phenyl ethyl alcohol to such monophenyl ethyl phthalate, the impurities of alcoholic nature are reduced to a very small percentage by fractional distillation of the crude phenyl ethyl alcohol. Then such alcohol is reacted with phthalic anhydride either alone or in benzene, toluene, xylene, ether or equivalent solvent medium to form the desired ester. The solvent is then directly distilled off and the residue is distilled with steam or an equivalent operation is performed e. g. water is added to the mixture distilled without necessarily introducing steam as such.

As a result of the foregoing treatment, residual alcoholic impurities such as ethyl alcohol, amyl alcohol or chlorhydrin will combine with the phthalic anhydride to form phthalates which will be non-volatile in steam. But the other impurities and particularly diphenyl may be entirely eliminated.

After the mono-phenyl ethyl phthalate has been thus steam distilled, with removal of impurities as aforesaid, it is next treated with excess caustic soda solution or other alkaline material and heated. This hydrolyzes the phthalate to phenyl ethyl alcohol with simultaneous formation of sodium phthalate. The alcohol is removed from the reaction mixture by extraction with a suitable solvent, by steam distillation, or it may be separated by stratification followed by steam distillation of the portion containing the alcohol.

For final purification the phenyl ethyl alcohol is distilled and residual alcoholic impurities such as hereinbefore referred to may then be completely or substantially entirely removed. The alkaline solution of sodium phthalate is acidified to precipitate the phthalic acid, which is removed by wheeling and then dried. By suitably heating the dried acid it is converted again to the anhydride, which may be used in a further operation.

As a specific illustration of my improved method of purifying phenyl ethyl alcohol, the following example is given:—

One molecule of crude phenyl ethyl alcohol in three times its weight of toluene is reacted with 1.1 molecule of phthalic anhydride, the reaction mixture being held at boiling temperature for several hours in a reflux still. Then the reflux is cut off and all of the toluene distilled off, this being accomplished at a still temperature of 135° to 140° C. Thereupon the still residue is steam distilled by passing in steam or putting in water and boiling until all impurities and particularly the diphenyl are removed. The heavy oil resulting from the preceding step is then drawn off and transferred to another still; 2.4 molecules of sodium hydroxide are added to the mixture refluxed as in the first step; whereupon the phenyl ethyl alcohol may be separated in the fashion already described. The water distillate is finally extracted with benzene, the benzene distilled off and the phenyl ethyl alcohol purified by final distillation.

The reactions involved in the operation may be represented by the following equations:—

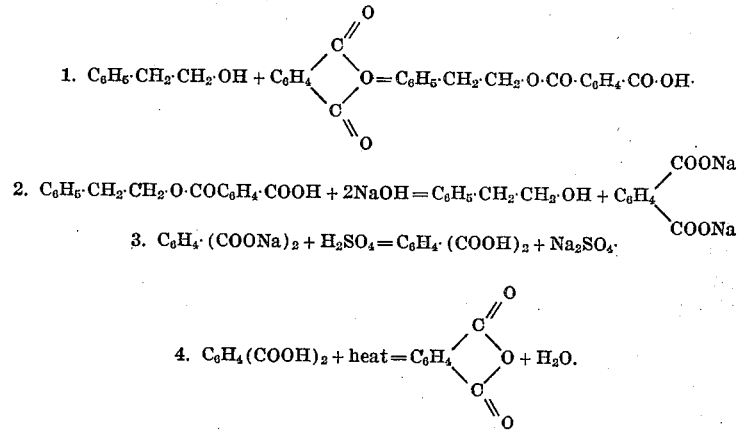

1. $C_6H_5 \cdot CH_2 \cdot CH_2 \cdot OH + C_6H_4(CO)_2O = C_6H_5 \cdot CH_2 \cdot CH_2 \cdot O \cdot CO \cdot C_6H_4 \cdot CO \cdot OH$ 2. $C_6H_5 \cdot CH_2 \cdot CH_2 \cdot O \cdot COC_6H_4 \cdot COOH + 2NaOH = C_6H_5 \cdot CH_2 \cdot CH_2 \cdot OH + C_6H_4(COONa)_2$ 3. $C_6H_4 \cdot (COONa)_2 + H_2SO_4 = C_6H_4 \cdot (COOH)_2 + Na_2SO_4$.

4. $C_6H_4(COOH)_2 + \text{heat} = C_6H_4(CO)_2O + H_2O$.

While in the foregoing description I have referred specifically to the use of phthalic anhydride, it should be explained that any available anhydride of ethane α-β- dicarboxylic acid wherein the carboxyl groups are on adjacent carbon atoms or a derivative of such acid equally with such phthalic anhydride, may be satisfactorily employed at least to the point in the process corresponding with the separation of the solution of the phthalate salt, as hereinbefore described, from the accompanying solvent medium. As other examples of compounds of the class described I may name maleic and succinic anhydrides, and for the purpose of convenient designation, in the claims hereinafter, such suitable compounds will be inclusively referred to as anhydrides of dibasic organic acids, whether of the aromatic or fatty series.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In the purification of synthetic phenyl ethyl alcohol, the steps which consist in converting the crude alcohol into a mono-phenyl ethyl phthalate, then steam distilling, and finally hydrolyzing the mono-phenyl ethyl phthalate into phenyl ethyl alcohol.

2. In the purification of synthetic phenyl ethyl alcohol, the steps which consist in fractionally distilling the crude alcohol, then converting the crude alcohol into a mono-phenyl ethyl phthalate, in a suitable organic solvent medium in which the reactants are soluble but non-reactive therewith, and then steam distilling.

3. In the purification of synthetic phenyl ethyl alcohol, the steps which consist in converting the crude alcohol into a mono-phenyl ethyl phthalate, steam distilling whereby other impurities and particularly diphenyl are removed, hydrolyzing such phthalate salt back to phenyl ethyl alcohol, removing the latter from the reaction mixture, and redistilling same to remove residual alcoholic impurities.

4. In the purification of synthetic phenyl ethyl alcohol, the steps which consist in treating the crude alcohol with a dibasic organic acid esterifiable therewith, then steam distilling, and finally hydrolyzing the ester back to phenyl ethyl alcohol.

5. In the purification of synthetic phenyl ethyl alcohol, the steps which consist in fractionally distilling the crude alcohol whereby the impurities of an alcoholic nature are reduced to a small percentage, then treating such alcohol with a dibasic organic acid esterifiable therewith, then steam distilling, and finally hydrolyzing the ester back to phenyl ethyl alcohol.

6. In the purification of synthetic phenyl ethyl alcohol, the steps which consist in treating the crude alcohol with a dibasic organic acid esterifiable therewith, steam distilling whereby other impurities and particularly diphenyl are removed, hydrolyzing such ester back to phenyl ethyl alcohol, removing the latter from the reaction mixture, and redistilling same to remove residual alcoholic impurities.

Signed by me, this 8th day of February, 1924.

EDGAR C. BRITTON.